United States Patent
Sahakian

[15] 3,664,499
[45] May 23, 1972

[54] HIGH SPEED AUTOMATIC SEQUENTIAL TESTER-HANDLER

[72] Inventor: Vahak K. Sahakian, Santa Clara, Calif.

[73] Assignee: Fairchild Camera and Instrument Corporation, Mountain View, Calif.

[22] Filed: Nov. 6, 1970

[21] Appl. No.: 87,389

[52] U.S. Cl. ............................................. 209/73, 209/81
[51] Int. Cl. ................................................ B07c 5/344
[58] Field of Search ...................................... 209/73, 81

[56] References Cited

UNITED STATES PATENTS

| | | | |
|---|---|---|---|
| 3,142,382 | 7/1964 | Knowles et al. | 209/81 |
| 3,032,191 | 5/1962 | Clukey | 209/81 |
| 3,503,500 | 3/1970 | Klossika | 209/81 |

*Primary Examiner*—Allen N. Knowles
*Attorney*—Roger S. Borovoy, Alan MacPherson and Charles L. Botsford

[57] ABSTRACT

A high-speed, high-accuracy, automatic sequential tester-handler that under control of a computer receives, tests and sorts semiconductor devices into separate groups according to their electrical characteristics.

8 Claims, 4 Drawing Figures

INVENTOR.
VAHAK SAHAKIAN
BY Charles L Botsford
ATTORNEY

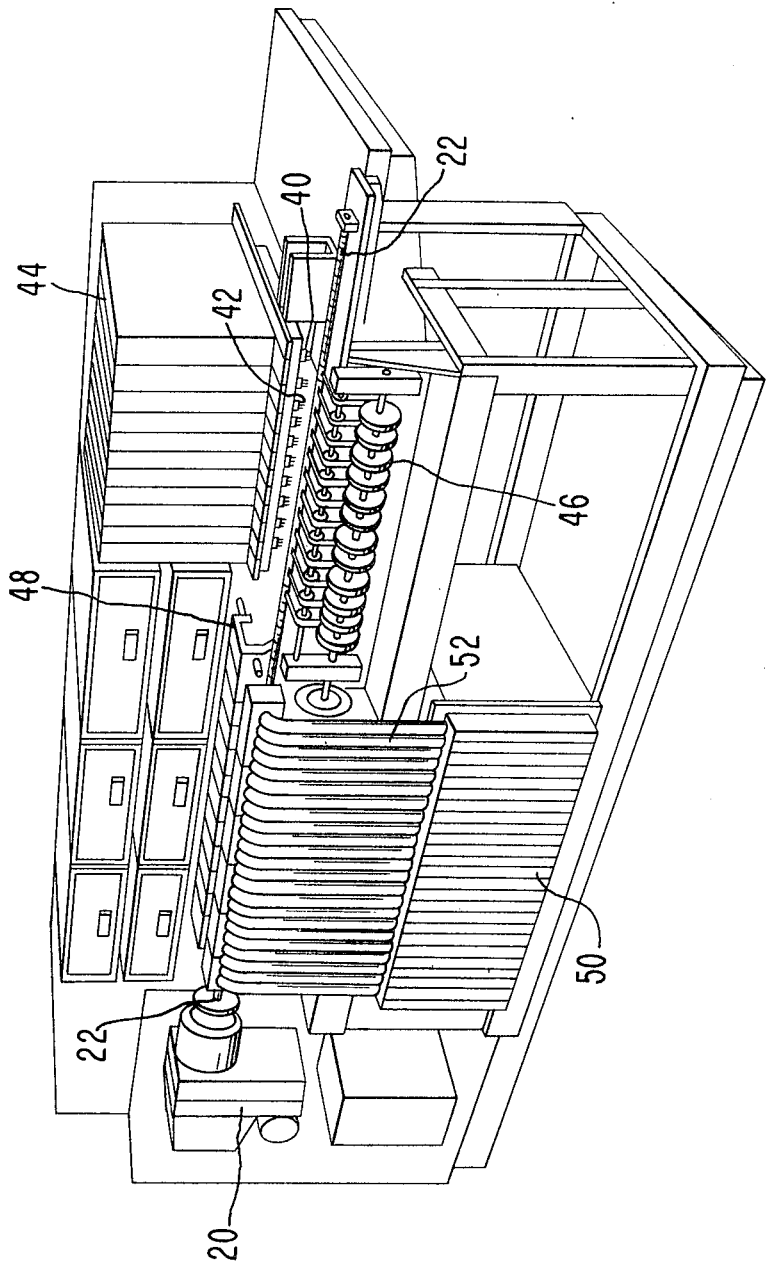

HIGH SPEED AUTOMATIC SEQUENTIAL TESTER-HANDLER

BACKGROUND OF THE INVENTION

1. Field of the Invention

This invention relates to an apparatus for high-speed, high-accuracy, automatic, sequential testing and handling of semiconductor devices. In particular, this invention relates to an apparatus for accurate receiving, testing, and sorting semiconductor devices into separate groups according to their electrical characteristics.

2. Description of the Prior Art

Semiconductor devices are classified according to their electrical characteristics, which can vary widely, so that it is necessary to test individually each assembled device. Individual testing helps ensure that each device can meet a particular specification.

Because many electrical parameters must be tested for each device, such as amplification (beta), leakage current, turn-on voltage, frequency of operation, and so forth, and it is often desirable to test the electrical characteristics at minimum, maximum, and average operating conditions, it is necessary to make from 200 to 300 electrical tests per discrete device. For integrated circuits or large-scale integration devices, it may be necessary to make thousands of tests per device. Since a large number of tests are needed per device, it is desirable that each test be made at a rapid rate.

Moreover, the tests must be performed accurately. Furthermore, some of the tests must be performed with signal levels in the range of milliamperes, or sometimes even microamperes. With such small signals, the impedance of the test equipment itself can affect the accuracy of the test results.

Previously, testing and sorting of semiconductor devices has been performed manually, semiautomatically by an operator using an electronic testing machine, or automatically under control of a computer. With operator-controlled testing, errors occur frequently due to operator fatigue. Also, there are limits to the speed at which an operator can function without error. The accuracy of computer-controlled testing has been limited by the impedance of the test equipment, which affects both the speed of each test and accuracy of the test results.

For high-volume, low-cost fabrication of semiconductor devices, it is therefore desirable to increase the speed and accuracy of the testing and sorting steps, particularly in view of the substantial decrease in the selling price of devices in recent years. Moreover, it is desirable to test and sort the devices using fast, accurate, automatic equipment that eliminates the limitations and disadvantages of the prior-art approaches to testing and handling devices.

SUMMARY OF THE INVENTION

The apparatus of the invention overcomes the above-mentioned limitations and disadvantages of prior-art approaches by increasing both the speed and accuracy at which the semiconductor devices are handled and tested. Briefly, the apparatus comprises a test control unit responsive to control signals from a computer; an index drive unit, helical shaft, and semiconductor carrier for rapidly and accurately moving the devices from station to station through the tester; multiple test leads and interchangeable modular instrumentation including analog-to-digital and digital-to-analog conversion circuitry in close proximity to the leads for testing the electrical characteristics of the devices and for quick test setup and rapid troubleshooting; lifters for rapidly applying the devices to the test leads; ejectors for selectively removing the devices from the carrier; and bins for receiving the ejected devices. Each of the mechanical functions of the apparatus can be performed at a repetitive rate that is independent of the repetitive rate of the other mechanical functions, so that the mechanical functions can be varied to be compatible with the electrical test pattern desired.

BRIEF DESCRIPTION OF THE DRAWINGS

FIG. 2 is a simplified isometric drawing of a high-speed, high-accuracy, sequential tester-handler for receiving, testing, and sorting semiconductor devices according to their electrical characteristics.

DESCRIPTION OF THE PREFERRED EMBODIMENT

Figure 1:
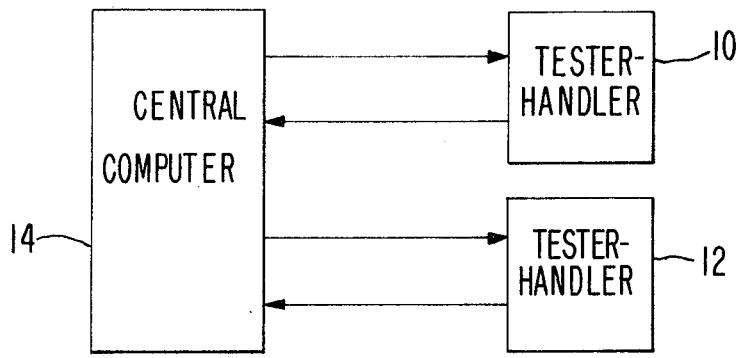
FIG. 1 is a simplified block diagram of a semiconductor test system comprising a plurality of tester-handlers controlled by a central computer.

Referring to FIG. 1, the apparatus for testing and handling devices is part of a test system comprising a pair of tester-handlers 10 and 12 (hereinafter referred to as testers) under control of a central computer 14. A carrier containing a plurality of semiconductor devices therein is fed into a tester 10 or 12. Each tester automatically, sequentially and rapidly tests the devices, and sorts them into groups according to their electrical characteristics. After each of the devices from a particular carrier have been tested and deposited into an appropriate bin, the carrier is ready for reuse with a new batch of semiconductor devices.

Test data from each device is transmitted to the central computer 14 for storage and is used to determine the group into which the device is placed during the sorting function. Because there are many electrical parameters to test for each device as well as the large number of devices to be tested, the test sequence must be performed accurately and rapidly.

Referring to FIG. 2, each individual computer-controlled tester-handler receives, transports, and tests semiconductor devices, and then sorts them into groups according to their electrical characteristics. The transporting mechanism comprises an index drive unit 20, a helical shaft 22 rotatably coupled thereto, and a plurality of device carriers. Preferably, the shaft diameter is kept to a minimum such as an inch, which provides a low rotational moment of inertia and allows high-speed operation, such as start-stop index frequencies of at least ten cycles per second.

Figure 3:
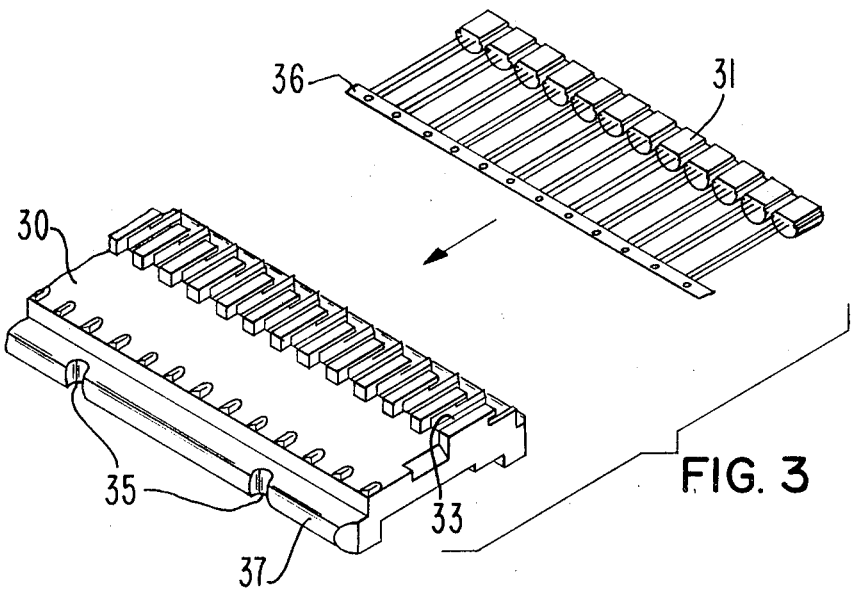
FIG. 3 is a simplified isometric drawing of a device carrier along with a plurality of devices banded together and ready for insertion into the carrier.
Figure 3A:
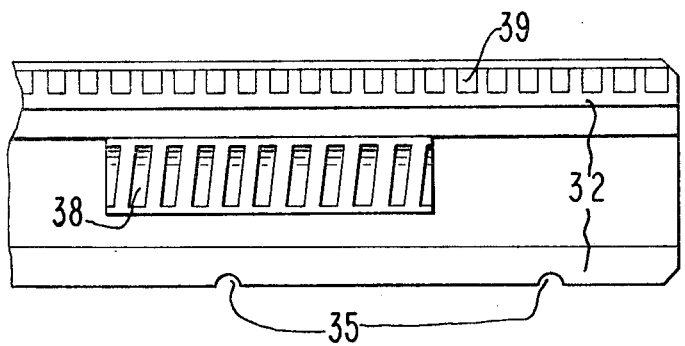
FIG. 3A is a simplified drawing of the back side of the device carrier.

The device carrier 30, shown in FIG. 3 and 3A, has a plurality of slots 38 corresponding to the pitch of the helical shaft located along the bottom carrier surface. Referring back to FIG. 2, when the carrier 30 is placed upon the helical shaft 22, the former is pulled via the slots 38 through the tester from station to station as the shaft rotates.

In this embodiment, the pitch of the helical shaft 22 is equal to the width of a semiconductor device to be tested. A complete, single rotation of the shaft 22 moves a carrier located thereon one pitch distance, which is the same as the width of one semiconductor. Each of the test stations are separated by a distance equivalent to the width of a semiconductor device being tested, so that a device located on the carrier is thus moved from one test station to the next as the shaft 22 rotates, and so forth until it is time to remove the device from the carrier. However, it is within the scope of the invention to have pitch distances other than the precise width of the device to be tested, and to turn the shaft 22 other than a complete rotation for each increment of movement of the carrier 30. A plurality of spaced semiconductor devices 31, held together by a band, or strip 36, are shown in FIG. 3 ready for insertion into the carrier 30. The carrier 30 comprises insulating material with a plurality of spaced cells 33 located on the upper surface thereof, with a spring-mounted clamp in each cell. The cells 33 receive and firmly retain semiconductor devices located therein and allow rapid ejection therefrom. A plurality of longitudinal ribs 32 located along the lower surface of the carrier allow similar carriers to be stacked one on top of the other for quick removal of the bottom carrier from the stack. The strip 36 holding the devices 31 together can be removed as desired while the devices are located in the carrier 30. A plurality of notches 35 located along one side of the carrier 30 provide for alignment of the carriers 30 in a stack. Also located along the lower surface of the carrier 30 are a plurality of locating indentations 39 (or segmented ratchet teeth) for providing lateral alignment of the carrier when it is lifted off the shaft 22 to make contact to the test leads 42. Each of the indentations 39 is aligned with reference levers (discussed below).

The helical shaft 22 provides a highly accurate technique of moving the devices through the tester, because it is an accurate translator of both rotary and linear motion. Being stationary, the helical shaft 22 does not traverse with respect to the machine frame or drive; any positional inaccuracies due to machining errors in the original fabrication of the shaft 22, that is, variations in pitch along the shaft's length, remain stationary. Cumulative errors are thus eliminated. In addition, the helical shaft 22 has a longer life compared to mechanisms using translating parts, its operation is relatively simple, and it can be obtained at a relatively low cost.

Adjacent to a portion of the helical shaft 22 are a plurality of spaced contactor blocks 40 containing a set of test leads 42, each set being electrically coupled to modular instrumentation 44 comprising analog-to-digital and digital-to-analog conversion circuitry. The modules 44 are in close proximity to the contactor blocks 40, thereby reducing the impedance and signal path length of test signals. Preferably, the modules 44 are interchangeable, thereby enabling quick test setup and rapid troubleshooting.

Suitably, there is one contactor block 40 for each module 44. In response to a control signal from the central computer, the shaft 22 stops rotating, and the carrier 30 is tilted up to apply devices located thereon to the test lead contacts 42. Electrical signals are converted from digital-to-analog form by the digital-to-analog circuitry and then applied to the devices to be tested and the outputs are measured. The analog output of the electrical signal is converted to digital form by the analog-to-digital conversion circuitry in the modules 44, and the test data are transferred to a central computer for storage. Later, the stored data are used to determine in which group a particular device is to be placed. Because the conversion circuitry is kept in close proximity to the contactor blocks 40 and the test signals are kept in digital form except during the time that they are applied to the devices to be tested, the test results are relatively free of impedance in the test circuitry and therefore highly accurate. Moreover, the length of the signal path is relatively short, thereby reducing the signal time and increasing the test speed.

The function of lifting the carrier 30 in order to apply the devices thereon to the test leads 42 suitably is provided by a plurality of hydraulically actuated, electrically controlled, actuators 46. Under a control signal from the computer, the actuators 46 lift an edge of the carrier 30 so that it is disengaged from the drive shaft 22. The carrier 30 tilts on a curved edge 37 thereof until the semiconductor devices located thereon make contact with the test leads 42. Included with the actuator mechanism 46 are a plurality of reference levers that align with the carrier indentations 39 (see FIG. 3A) and function to locate accurately the carrier and devices thereon when the carrier is lifted off the helical shaft 22.

At the end of a test sequence, the actuators 46 drop off, allowing the carrier 30 to return and mesh with the drive shaft 22 for the next index step. The step of applying the devices to the contactor blocks 40, removing them, and then transporting them to the next test station is performed rapidly and accurately via the lifters 46 and the helical shaft 22.

Once a carrier 30 (see FIG. 3) has passed the test area, the semiconductor devices located thereon are ready for sorting according to their electrical characteristics. The sorting function is performed by a plurality of ejectors 48 aligned with a plurality of bins 50, one for each ejector. Electrically controlled by signals from the central computer, the ejectors 48 at the end of each index step are triggered to selectively remove devices from the carrier 30 so that the devices fall into the proper bin 50. Conveniently, a chute 52 is provided between each ejector 48 and the respective bin 50 to guide the device once it has been removed from the carrier 30.

Devices falling into each bin 50 are counted by the computer. After a desired count for a particular bin has been reached, a signal light is lit, indicating that the operator should empty the bin. One signal light is provided for each bin. A switch at each bin resets the bin count when the operator empties the bin.

The apparatus as described above for testing and handling semiconductor devices is extremely flexible in that the repetition rate of each of the mechanical functions can be changed to be compatible with any test pattern desired. For example, the repetitive rate of the shaft rotation, or of the hydraulic lifters, or both, can be varied as desired. The length of time a device must be at each test station is determined by which test module requires the longest time period for the testing function. After the test period is determined, the time needed to mechanically move the devices through the apparatus and apply them to the test leads can be varied as desired. Hence, the apparatus of the invention is substantially more flexible when compared to testers of the prior art.

I claim:

1. Apparatus for fast, accurate, automatic, sequential testing and sorting of semiconductor devices in response to control signals from a computer, the apparatus comprising:
   means for controlling the electrical and mechanical functions of the apparatus;
   means for transporting the devices through the apparatus, said transporting means comprising an index drive unit, a helical shaft, and a carrier;
   means for testing the electrical characteristics of the devices;
   means for applying the devices to the testing means; and
   means for sorting the devices into groups according to their electrical characteristics.

2. Apparatus as recited in claim 1 wherein the control means receives command signals from a computer and generates electrical and mechanical control signals to the transporting, testing, applying, and sorting means.

3. Apparatus as recited in claim 1 wherein the helical shaft has a pitch equal to the width of a device to be tested.

4. Apparatus as recited in claim 1 wherein the carrier comprises insulating material with a plurality of spaced cells located along the upper surface thereof, a spring-mounted clamp in each cell for receiving and firmly retaining a semiconductor device and allowing rapid ejection therefrom;
   a plurality of helical slots located along the lower surface matching the profile of the helical shaft;
   one edge of the substrate being curved to function as a pivot point when the substrate is raised;
   a plurality of longitudinal ribs extending along the lower surface to allow similar carriers to be stacked one on top of the other and enable quick removal of the bottom carrier from the stack; and,
   a plurality of locating indentations located along the lower surface for maintaining lateral alignment when the carrier is lifted off the helical shaft to contact the test leads.

5. Apparatus as recited in claim 1 wherein the testing means comprises a plurality of sets of spaced test leads aligned with the terminal leads of the devices to be tested; and
   modular instrumentation comprising analog-to-digital and digital-to-analog conversion circuitry in close proximity to the test leads and electrically coupled thereto.

6. Apparatus as recited in claim 4 wherein the applying means comprises hydraulically actuated, electrically controlled actuators that lift and tilt the carriers immediately underneath the testing means so that the devices therein make contact with the test leads, the carriers being disengaged from the helical shaft, and reference levers aligned with said locating indentations on the lower surface of the carriers for maintaining lateral alignment during each test.

7. Apparatus as recited in claim 1 wherein the sorting means comprises:
 a plurality of ejectors capable of rapidly removing devices individually or in groups from the carrier; and,
 a plurality of bins for receiving devices removed from the carriers.

8. Apparatus as recited in claim 4 further defined by means for removing the carrier from the helical shaft and placing it into a separate bin for subsequent use.

* * * * *